(No Model.)

J. PORTEOUS.
HARROW.

No. 522,086. Patented June 26, 1894.

Witnesses:

Inventor
James Porteous
By Dewey & Co.
Attys

UNITED STATES PATENT OFFICE.

JAMES PORTEOUS, OF FRESNO, CALIFORNIA.

HARROW.

SPECIFICATION forming part of Letters Patent No. 522,086, dated June 26, 1894.

Application filed January 10, 1894. Serial No. 496,422. (No model.)

*To all whom it may concern:*

Be it known that I, JAMES PORTEOUS, a citizen of the United States, residing at Fresno, Fresno county, State of California, have invented an Improvement in Harrows; and I hereby declare the following to be a full, clear, and exact description of the same.

My invention relates to the class of harrows, and it consists in the novel construction of the teeth whereby they are adapted to be inserted in holes in the harrow frame and to be tightened therein as occasion may require.

My invention, though applicable to the securing of teeth in the bars or frames of harrows in general, is especially applicable to those harrows in which the frame is made of tubular iron provided with holes through which the teeth pass, and on account of the greater tendency of rotary harrows to loosen their teeth, due to the pressure from all directions, my invention is especially adapted to such harrows, in which connection I have herein illustrated it.

The object of my invention is to provide a simple means for keeping the teeth tight under all circumstances, and providing for the replacing of the same teeth and tightening them without the assistance of any washers or other wedges.

Figure 1:
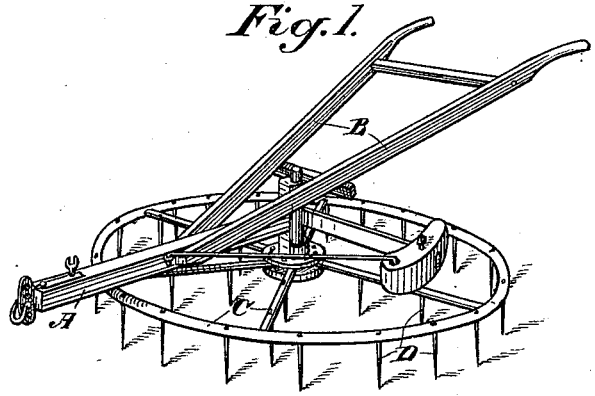
Figures 2, 3:
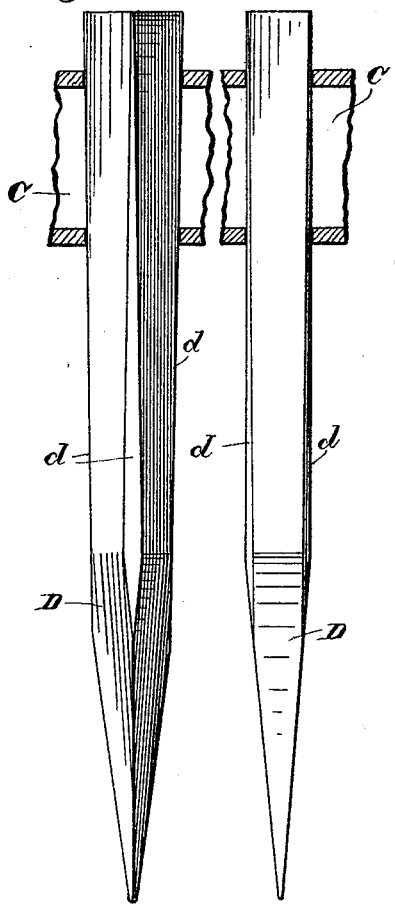
Figure 6:
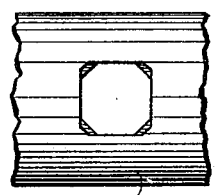
Figures 4, 5:
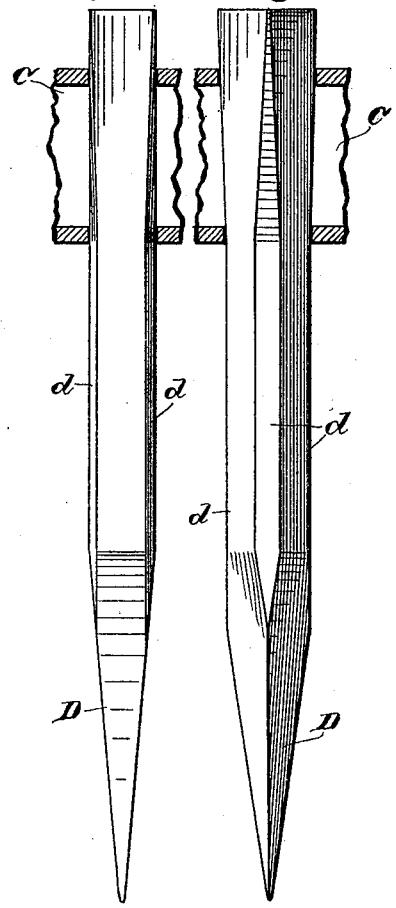

Referring to the accompanying drawings for a more complete explanation of my invention,—Figure 1 is a perspective view of a rotary harrow, a form to which my invention is specially applicable. Fig. 2 is a corner elevation of a tooth showing it in the frame bar. Fig. 3 is a side elevation of same. Fig. 4 is a side elevation of a tooth in which the chamfer or bevel does not extend as far downwardly as that shown in Figs. 2 and 3. Fig. 5 is a corner elevation of same. Fig. 6 is a top view of a frame bar showing the hole therein.

A is a beam, B the handles and C the frame of a well known form of rotary harrow. The periphery of this frame, as well as the spokes, are made of tubular iron or gas pipe. The teeth D are secured in the gas pipes by being passed downwardly through holes made in the latter. It is the common practice to make these holes round and to make the teeth, where they bind in the holes, square in cross section. By being driven down through these round holes, the square body of the teeth binds in them, and thus the teeth are secured. In time, however, they work loose, and where the body of the tooth is uniform in cross section, it is obvious that driving it down any farther will not tighten it.

My improvement consists in making upon the corners of a tooth, having its body of approximately uniform cross section, the chamfers or bevels $d$ which increase in width or depth from the top of the tooth downwardly. These chamfers may continue on down until they run out in the usual tapering point of the tooth, as shown in Figs. 2 and 3, or they may extend only part way from the upper end, the rest of the body which does not bind in the hole being beveled or chamfered equally, as shown in Figs. 4 and 5. Thus, I provide a tooth having all the advantages of a body with a uniform cross section throughout, and having further the necessary wedging action, because as my tooth is driven downwardly, it is obvious that the gradually decreasing chamfer or bevel will bind more tightly in the hole in the gas pipe, and this is true even upon replacing an old tooth, in which case it will be tightened, as well as in the first instance.

Another advantage is obtained by disposing of the sharp corners of the tooth thereby avoiding any tendency to split the gas pipe.

Having thus described my invention, what I claim as new, and desire to secure by Letters Patent, is—

1. A harrow tooth having a tapering point and a body of substantially uniform cross section, the corners of said body being chamfered with bevels increasing in width and depth from the upper end of the tooth downwardly, substantially as herein described.

2. In a harrow and in combination with its frame bars having holes, a tooth with a tapering point, and a body having a substantially uniform cross section, said tooth having the corners of its body chamfered with bevels increasing in width and depth from its upper end downwardly, whereby the tooth may be tightened in the holes of the frame bars, substantially as herein described.

3. In a harrow having a frame of tubular iron or gas pipe with holes through it, a tooth having a tapering point and a body with a substantially uniform cross section the corners of said body being chamfered with bevels gradually increasing in width and depth from its upper end downwardly whereby the tooth may be tightened in the holes in the tubular or gas pipe frame, substantially as herein described.

In witness whereof I have hereunto set my hand.

JAMES PORTEOUS.

Witnesses:
S. H. NOURSE,
H. F. ASCHECK.